March 6, 1956 — L. G. SYMONS — 2,737,295
FEEDING DEVICE FOR SCREENS
Filed July 11, 1951 — 2 Sheets-Sheet 1

Inventor
Loren G. Symons
by Parker & Carter
Attorneys

March 6, 1956 — L. G. SYMONS — 2,737,295
FEEDING DEVICE FOR SCREENS
Filed July 11, 1951 — 2 Sheets-Sheet 2

Inventor
Loren G. Symons
by Parker & Carter
Attorneys

United States Patent Office 2,737,295
Patented Mar. 6, 1956

2,737,295

FEEDING DEVICE FOR SCREENS

Loren G. Symons, Hollywood, Calif., assignor to Nordberg Manufacturing Company, Milwaukee, Wis., a corporation of Wisconsin Application July 11, 1951, Serial No. 236,245

1 Claim. (Cl. 209—254)

My invention relates to an improvement in feeding devices for screens and has for one purpose to provide improved feeding means at the feed end of a vibratory screen.

Another purpose is to provide means for uniformly distributing the feed across the end of a horizontal or generally horizontal vibrated screen, whereby a generally uniform feed is obtained across the width of the screen cloth at the feed end of the screen.

Another purpose is to provide improved feed controlling fingers, or an improved feed controlling assembly for the end of a screen.

Other purposes will appear from time to time in the course of the specification and claim.

I illustrate the invention more or less diagrammatically in the accompanying drawings, wherein.

Like parts are indicated by like symbols throughout the specification and drawings.

Figure 1:
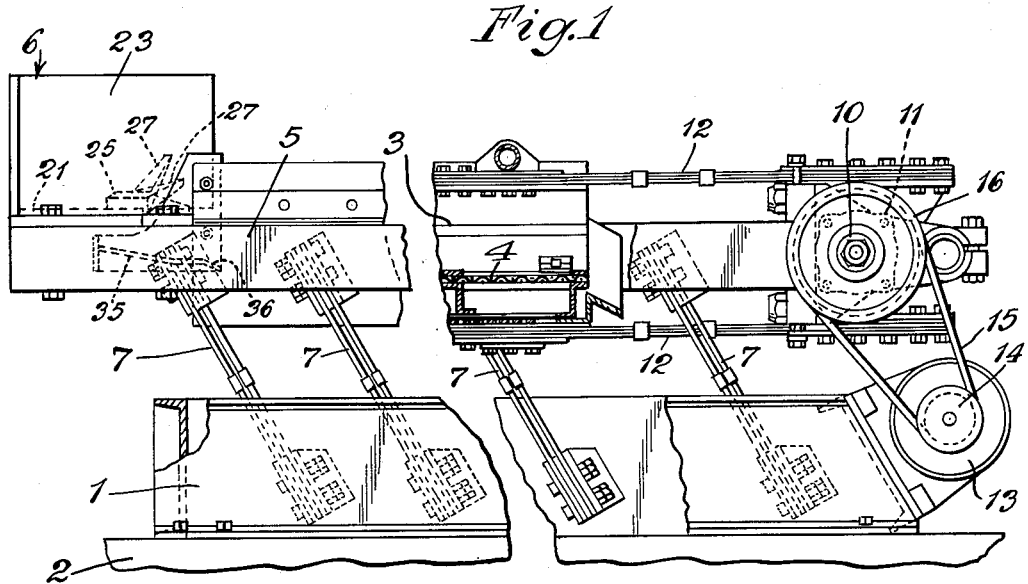
Figure 1 is a side elevation with parts broken away.
Figure 2:
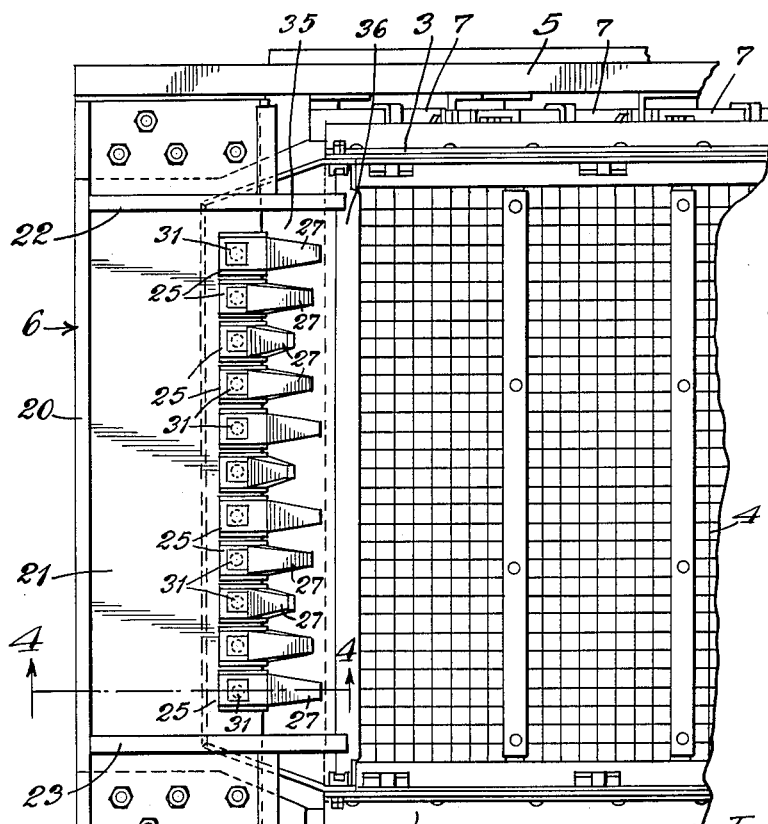
Figure 2 is a partial plan view illustrating the feed end of a screen.
Figure 3:
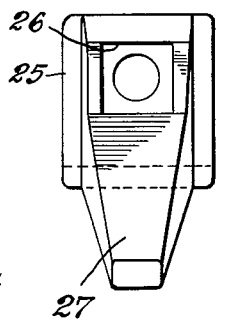
Figure 3 is a plan view illustrating one of the feed distributing teeth.
Figure 4:
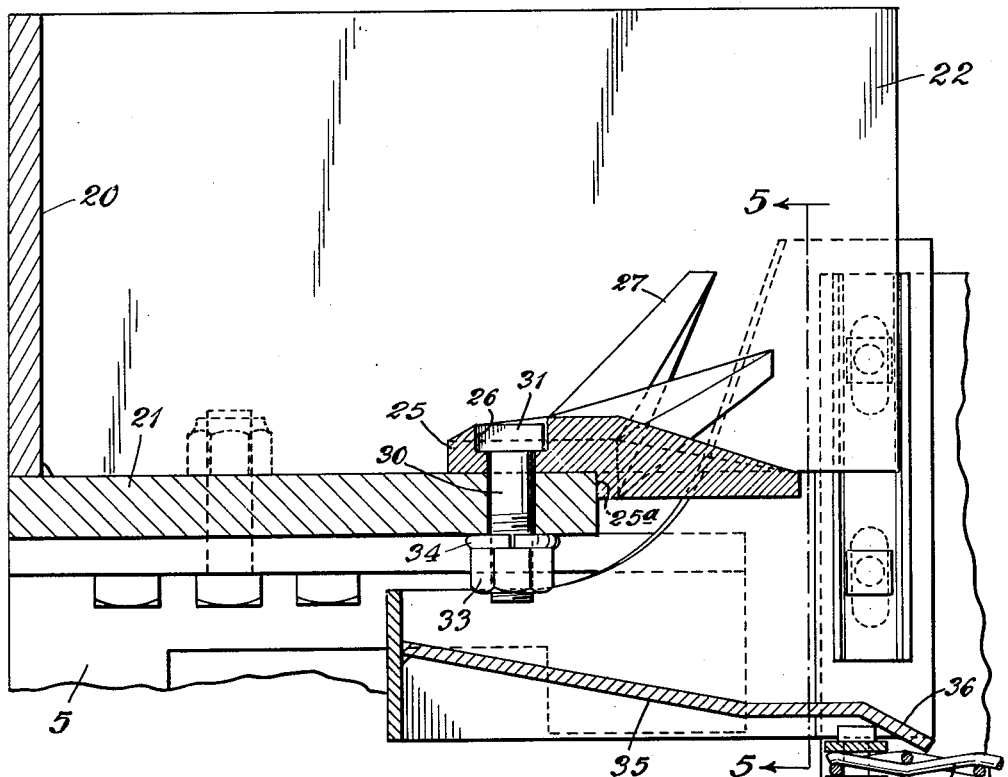
Figure 4 is a section on the line 4—4 of Figure 2 on an enlarged scale.
Figure 5:
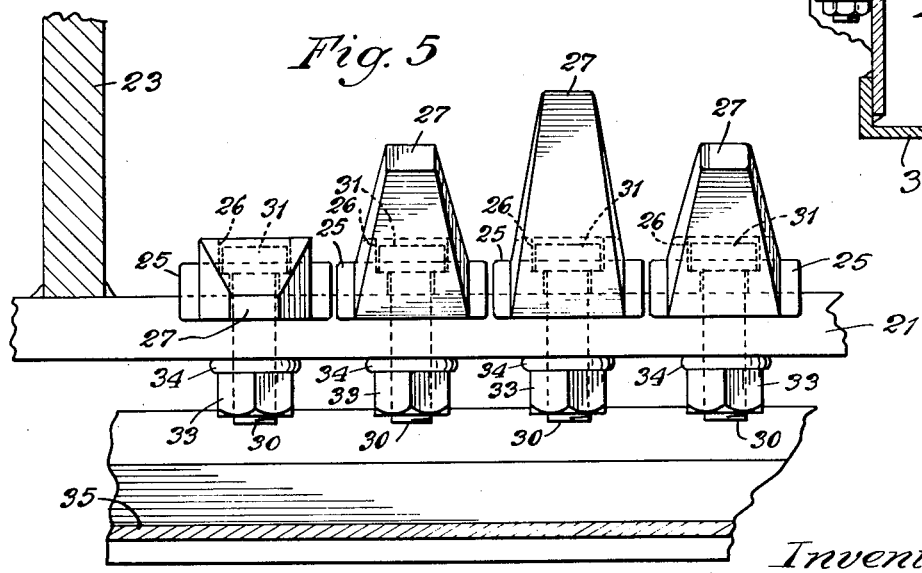
Figure 5 is a section on the line 5—5 of Figure 4.

Referring to the drawings, 1 generally indicates any suitable base mounted upon any suitable supporting support or structure indicated at 2. 3 generally indicates any suitable screen deck, the details of which do not of themselves form part of the present invention. 4 indicates any suitable screen cloth or medium mounted on such deck. 5 indicates longitudinally extending weights or balance bars, the ends of which, at the feed end of the screen, are secured to or connected by any suitable feed box generally indicated at 6.

It will be understood that both the screen deck 3 and the side bars 5 are vibratably mounted on the base 1 by a plurality of inclined leaf spring elements 7. However, this particular mounting means is a matter of illustration, rather than of limitation, as my invention can be applied to screens which are otherwise supported.

In the particular screen herein shown I employ a counterbalanced eccentric drive which, through means which do not form part of the present invention, oscillates the screen deck 3. I illustrate, for example, a housing 11 for the rotor, which is connected by horizontally extending leaf spring elements 12 to the discharge end of the screen deck 3. Any suitable motor 13 may be employed which, through a pulley 14, belt 15, and sheave 16 drives the rotor 10 and thus causes vibration of the screen deck. This vibration or oscillation means is a matter of illustration, and any suitable means may be used to vibrate or oscillate the screen.

The novelty of my invention relates to the means I employ in connection with the feed box 6 for maintaining a generally uniform feed across the entire width of the screen deck or of the screen cloth 4 carried thereby. I preferably employ a feed box of relatively thick metal plate. It may include, for example, an end wall 20, a bottom plate 21 and side plates 22, 23. These constitute, as will be clear from the drawings, a rather massive counterweight structure. The box thus formed is open at the top and is partially open along the side from which material is delivered toward the screen deck. I partially close this otherwise open side by employing a series of rather massive feed teeth. Each such tooth includes a base 25 apertured as at 26 to receive a positioning bolt head. Extending from the base 25 is a tooth proper 27. The elements 27 are inclined from the base portion 25 at various angles. The tooth portions also extend downwardly below the feed edge of the bottom plate 21 and abut it as at 25a. The parts are thus proportioned so that where a bolt 30 is used with a head 31 it conforms generally to the aperture 26. The teeth are held in the desired positions by any suitable nut or nuts 33 which oppose the bottom surface of the plate 21. I may of course use any suitable lock washers 34. The feed box includes or overlies a more or less downwardly inclined feed plate 35, the feed edge 36 of which overlies the receiving edge of the screen cloth 4.

In the use of my device, I may deliver any suitable material to be screened to the interior of the above-described box at any convenient point. Fingers may be employed of various size and in various arrangements. They may be varied or adjusted or changed to meet or compensate for irregularities in the direction of the incoming feed. For example, where the feed happens to be delivered to the center of the feed box, a different tooth arrangement will be employed than if the feed were concentrated at one or the other of the two ends of the feed box. The size and nature and range of size of the feed particles may also justify or necessitate changes in size, angle and arrangement of the teeth.

It will be realized that whereas I have described and claimed a practical and operative device, nevertheless many changes may be made in size, shape, number and disposition of parts without departing from the spirit of my invention. I herefore wish my description and drawings to be taken as in a broad sense illustrative or diagrammatic, rather than as limiting me to my precise disclosure herein. In particular, I wish it to be understood that whereas I illustrate my invention as applied to a feed box, employable in connection with a counterbalanced horizontal vibrated screen, I may employ it in connection with screens otherwise designed and otherwise vibrated and supported.

The use and operation of my invention are as follows:

I illustrate a plurality of feed controlling fingers, which may be arranged at varying angles of inclination and in varying arrangement, to compensate for irregularities in the direction and point of application of incoming feed. By using these fingers, I obtain an adequately uniform feed across a screen of substantial width at the feed end of the screen. By using my invention, I make unnecessary the employment of means for changing the direction of the incoming feed. Also I avoid the necessity of employing baffle plates or the like.

A further advantage of my invention is a stratifying effect, which results from the fact that the finer particles in the incoming feed will pass between the fingers and the coarser particles will pass over the fingers. This has the advantage of permitting the smaller sized particles to reach the screen cloth first. This not only tends to more efficient screening, but also permits the finer particles to protect the screen cloth against the rubbing or scrubbing or abrading action of the coarser particles.

The shape and number of fingers used and the space between the fingers may be widely varied, depending upon the size characteristics of the feed to the screen.

It will be noted that the shaping of the individual teeth is such that, although they may readily be applied or removed, they are firmly held in position by nuts which are protected from the feed by being opposed to the lower side of the bottom plate 21 of the feed box.

I claim:

A feed box adapted to deliver material to vibrating screens and the like including a bottom wall, side walls and an end wall, said walls defining a space open at one end, whereby material in the box may flow through said open end, a plurality of fixed teeth positioned on said bottom wall and having their free ends extending beyond the edge of said bottom wall into said open end, there being upwardly and downwardly open spaces between said teeth whereby material flowing from said box through said open end may pass over said teeth and between the teeth from the space within the feed box to the screen with which said feed box is associated, said individual teeth extending at a plurality of angles from the horizontal, said teeth being tapered to provide spaces between adjacent teeth increasing outwardly from the bottom portions of said teeth.

References Cited in the file of this patent

UNITED STATES PATENTS

| | | |
|---|---|---|
| 5,250 | Behel | Aug. 21, 1847 |
| 12,308 | Brown | Jan. 30, 1855 |
| 52,841 | Free | Feb. 27, 1866 |
| 125,014 | Bradner | Mar. 26, 1872 |
| 176,242 | Reel | Apr. 18, 1876 |
| 325,249 | Johnson | Sept. 1, 1885 |
| 565,224 | Richards | Aug. 4, 1896 |
| 642,185 | Wehrer | Jan. 30, 1900 |
| 716,124 | Spangler | Dec. 16, 1902 |
| 1,190,329 | Schmidt | July 11, 1916 |
| 1,399,337 | Downie | Dec. 6, 1921 |
| 1,777,222 | Pierce | Sept. 30, 1930 |
| 1,804,756 | Elwood | May 12, 1931 |
| 1,909,850 | Younie | May 16, 1933 |
| 2,298,182 | Strube | Oct. 6, 1942 |
| 2,573,887 | Aasland | Nov. 6, 1951 |

FOREIGN PATENTS

| | | |
|---|---|---|
| 8,081 | Great Britain | Apr. 3, 1907 |
| 640,139 | Germany | Aug. 23, 1934 |